June 21, 1949. M. DEMEULENAERE 2,473,509
CASH REGISTER
Original Filed April 18, 1935 7 Sheets-Sheet 1

INVENTOR
Marcel Demeulenaere
BY
Glascock Downing & Seebold
ATTORNEYS

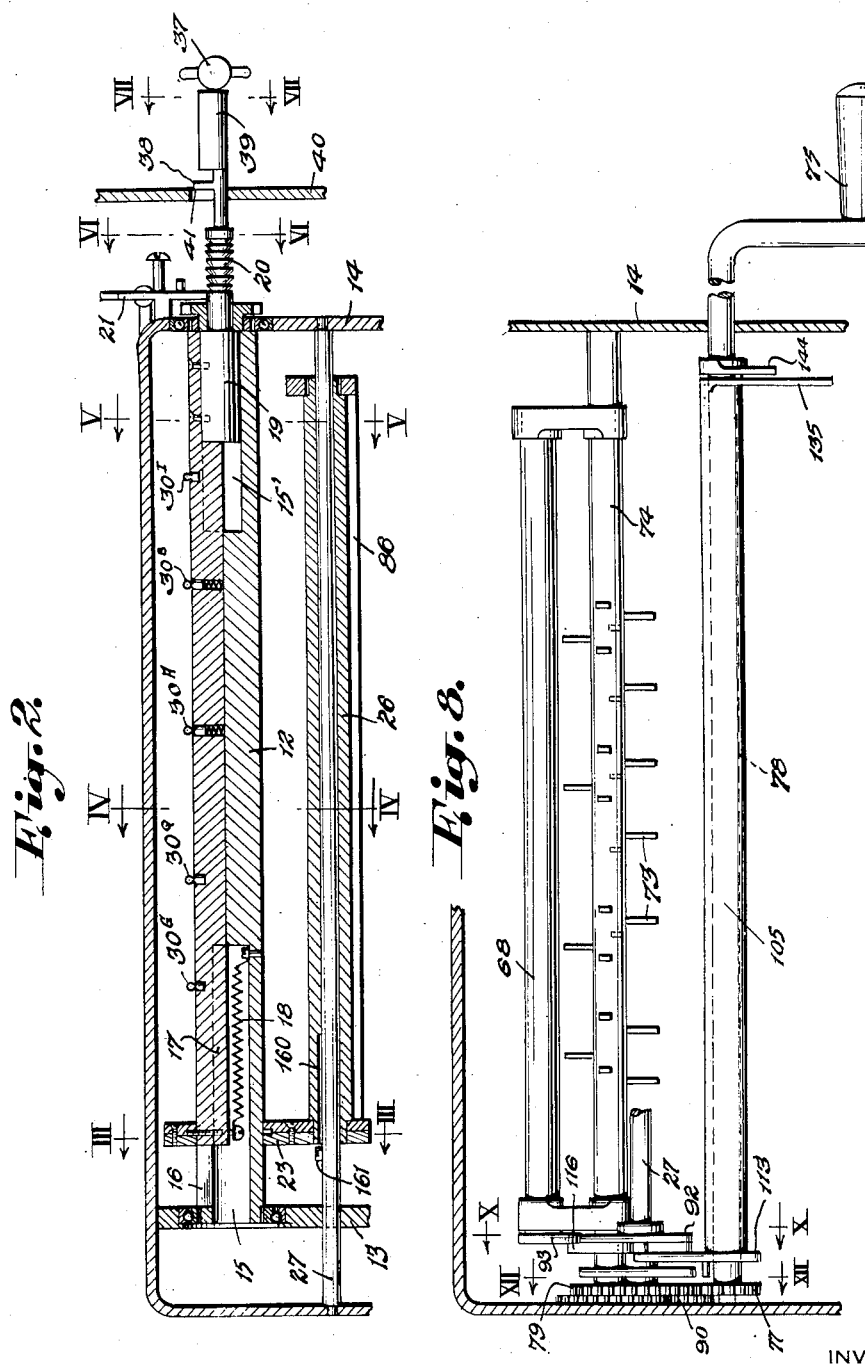

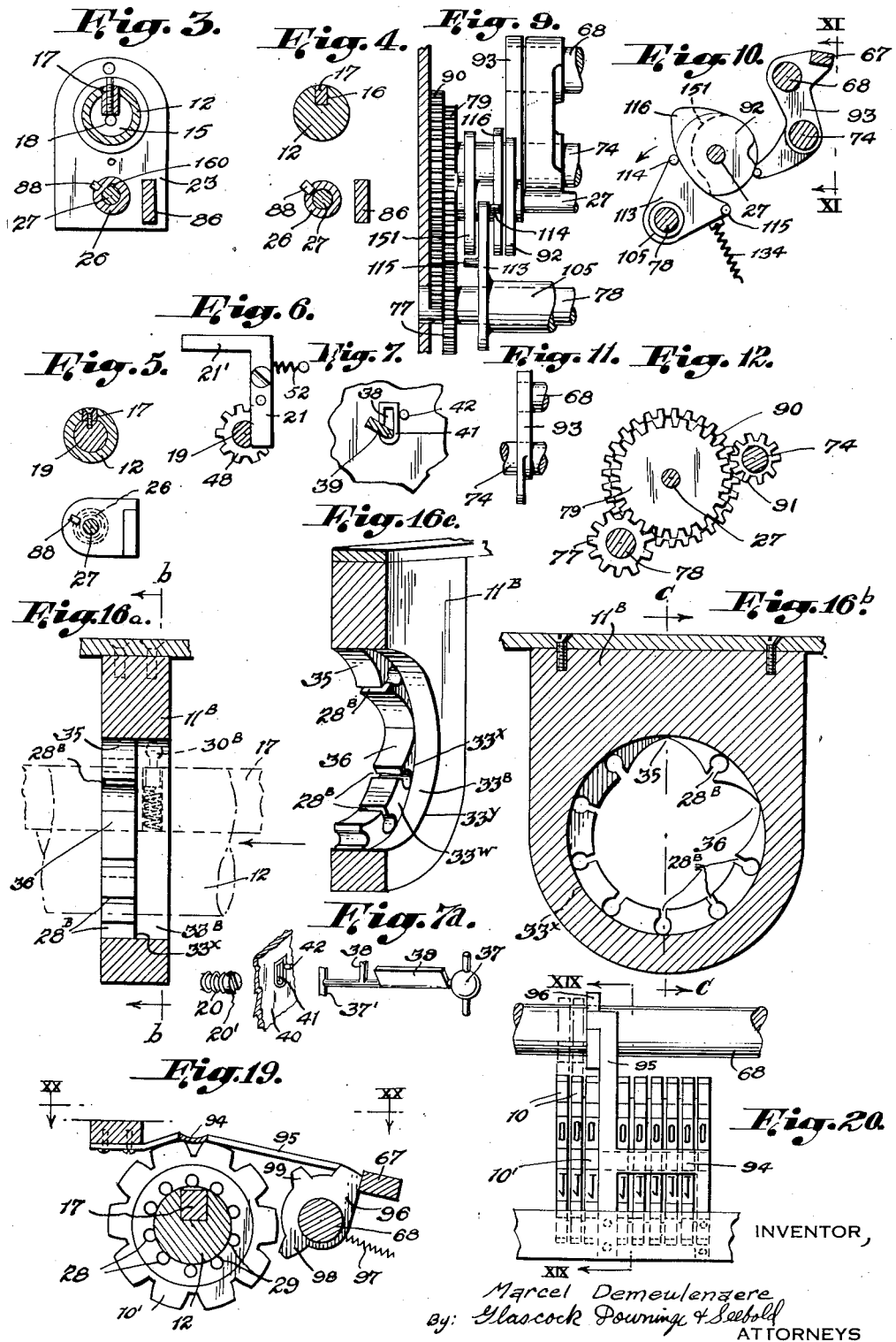

June 21, 1949.    M. DEMEULENAERE    2,473,509
CASH REGISTER
Original Filed April 18, 1935    7 Sheets-Sheet 4
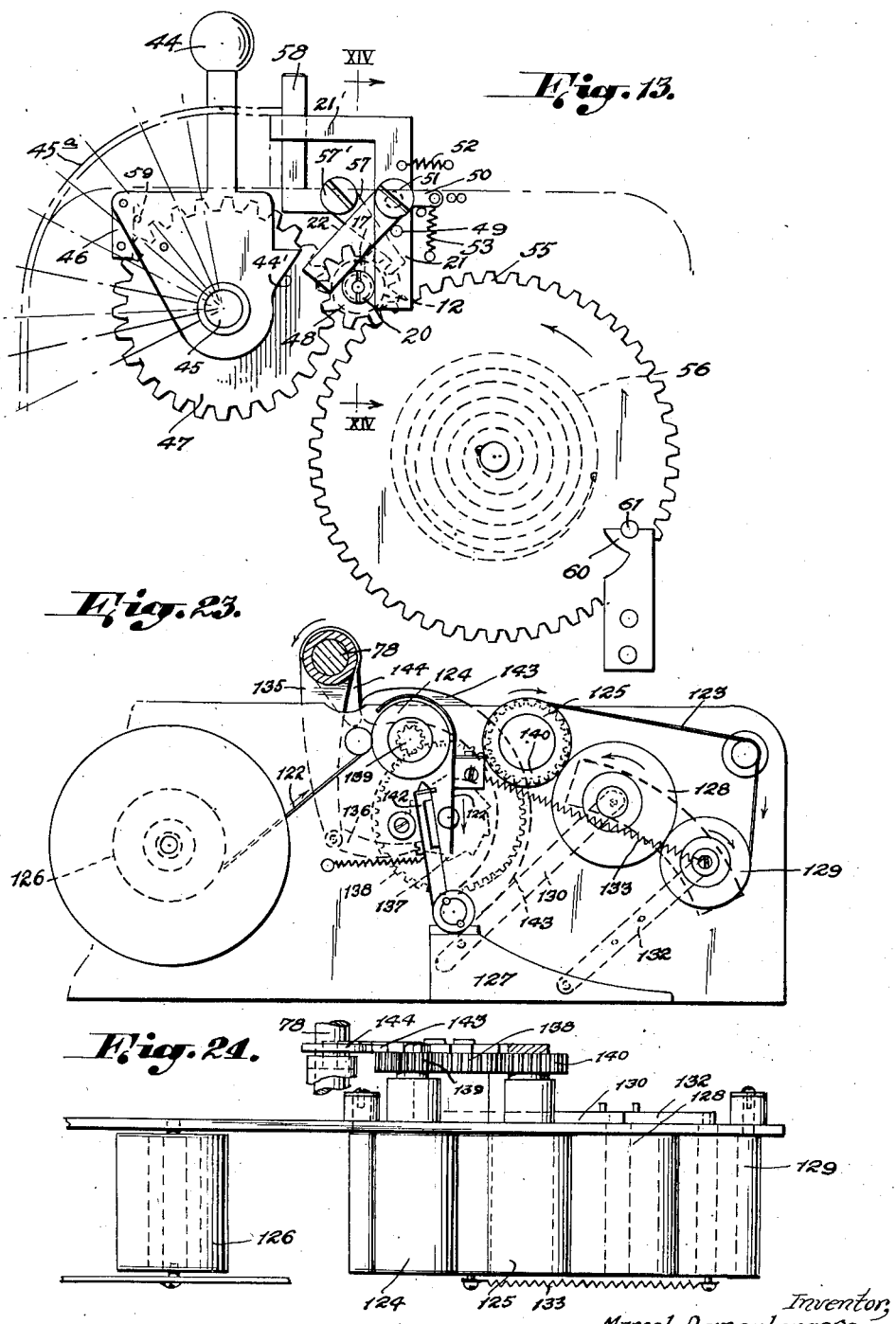
Inventor
BY Marcel Demeulenaere
Glascock Downing & Seebold
ATTORNEYS June 21, 1949.    M. DEMEULENAERE    2,473,509
CASH REGISTER
Original Filed April 18, 1935    7 Sheets-Sheet 5
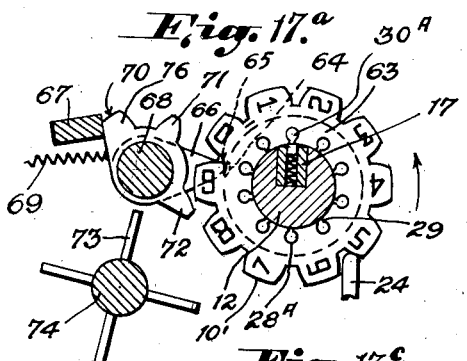
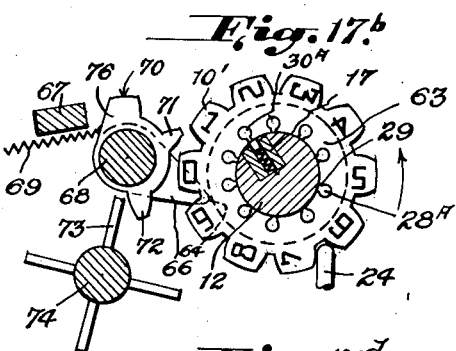
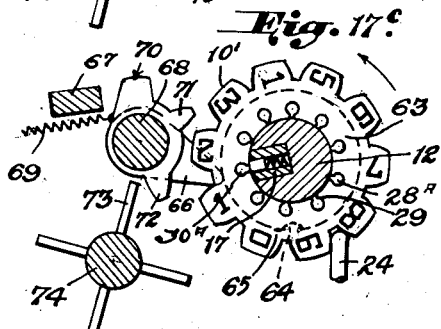
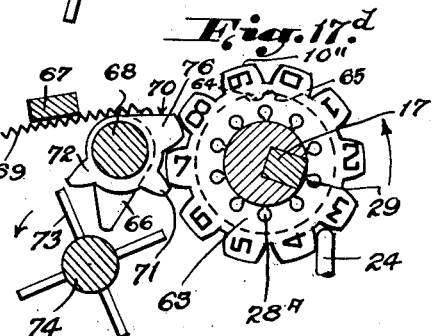
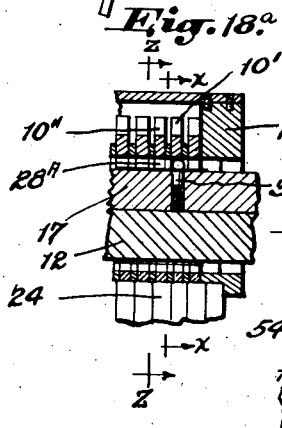
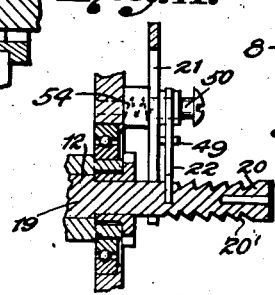
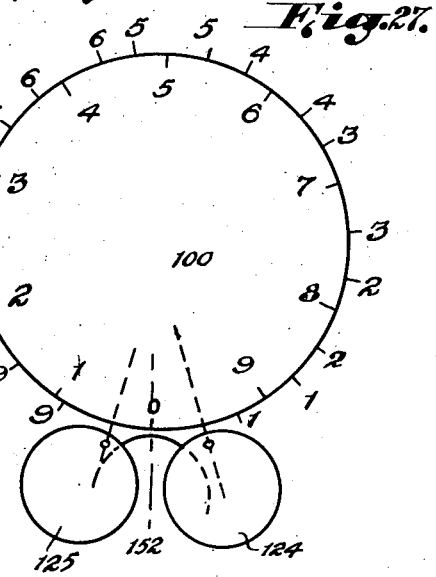
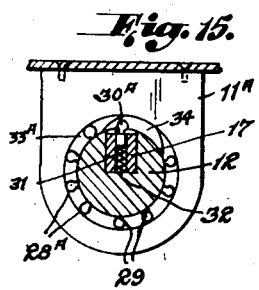
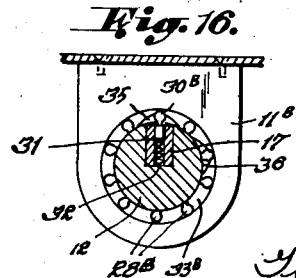
INVENTOR
Marcel Demeulenaere
BY
Glascock Downing & Seebold
ATTORNEYS June 21, 1949.　　　M. DEMEULENAERE　　　2,473,509
CASH REGISTER Original Filed April 18, 1935　　　　7 Sheets-Sheet 6

INVENTOR,
Marcel Demeulenaere
BY
Glascock Downing & Seebold
ATTORNEYS

June 21, 1949.  M. DEMEULENAERE  2,473,509

CASH REGISTER

Original Filed April 18, 1935  7 Sheets-Sheet 7

INVENTOR,
Marcel Demeulenaere
BY
Glascock Downing & Seebold
ATTORNEYS

Patented June 21, 1949

2,473,509

UNITED STATES PATENT OFFICE 2,473,509

CASH REGISTER

Marcel Demeulenaere, Flushing, N. Y.

Original application April 18, 1935, Serial No. 17,119. Divided and this application March 4, 1942, Serial No. 433,398. In Belgium January 26, 1935

13 Claims. (Cl. 235—2)

This is a division of my application Serial Number 17,119, filed April 18, 1935, and issued May 5, 1942, Patent Number 2,282,120.

My invention relates to cash registers, and has for its primary object to provide a cash register which is capable of carrying out all the necessary or desired operations, whilst having an extremely simple and strong mechanism, operated by a small number of parts, the manipulation of which is rapid and convenient.

Another object of the invention is to provide a cash register having a plurality of totalisers, some of said totalisers (hereinafter called general totalisers) partaking in all registering operations, the other totalisers (hereinafter called clerk's totalisers) partaking only in certain predetermined operations.

A further object is to provide a cash register, in which all the totalisers are actuated by a single operating member adapted to effect both the selection of the totaliser or totalisers to participate in the operation to be registered, and the actuation of the totalisers selected.

A still further object of the invention is to provide a cash register having for each totaliser a carry-over mechanism, the carry-overs becoming effective only on the intervention of a member independent of the operating member, thus permitting the correction of any error in a registration.

A still further object of the invention is to provide, in the cash register, a travelling printing mechanism adapted to print checking tickets after each operation and to print, when desired, the amounts accumulated on any of the totalisers.

A still further object is to arrange the printing mechanism in such manner, that it cooperates with the totalisers in order to reset the totaliser discs to zero.

An approved embodiment of the invention is illustrated by the accompanying drawing in which:

Figure 2 is a longitudinal section of the displaceable supporting means for the totaliser discs and related pawls;

Figures 3 to 7 are cross-sections through the lines III—III, IV—IV . . . VII—VII, respectively of Figure 2;

Fig. 7a is a perspective view of the right-hand part of Figure 2.

Figure 8 shows in front view members which, in Figure 1, are hidden;

Figure 9 is a view on a larger scale of the left-hand part of Figure 8;

Figure 10 is a cross-section on the line X—X of Figure 8;

Figure 11 shows in front view a detail of Figure 10;

Figure 12 is a cross-section on the line XII—XII of Figure 8;

Figure 13 shows on a large scale the manipulating and escape mechanism;

Figure 14 is a longitudinal section on the line XIV—XIV of Figure 13;

Figures 15 and 16 are two partial cross-sections on an enlarged scale on lines XV—XV and XVI—XVI respectively on Figure 1 to show two different selectors of partial totalisers;

Figure 16a is an axial section, on an enlarged scale, of the selector shown in Fig. 16;

Figure 16b is a cross-section on line b—b of Fig. 16a;

Figure 16c is a perspective view of one half of the selector, on line c—c of Fig. 16b;

Figures 17a, 17b and 17c are sectional views each on line x—x of Fig. 18a, illustrating different positions, and Figure 17d is a sectional view on line z—z of Fig. 18a.

Figure 18a is a sectional view similar to Fig. 18, with parts in another position.

Figure 19 is a cross-section on the line XIX—XIX of Figure 20, showing the detail of a counter of the operations of a clerk's totaliser;

Figure 20 is a plan view of this counter, in the direction of the arrows XX—XX of Figure 19;

Figure 23 shows in side view on a smaller scale the ticket mechanism, and

Figure 24 is a plan view of this mechanism.

Figure 27 is a diagrammatic view expressly for the purpose of showing the angular disposition of the several sets of type on one of the character wheels.

Figure 1:
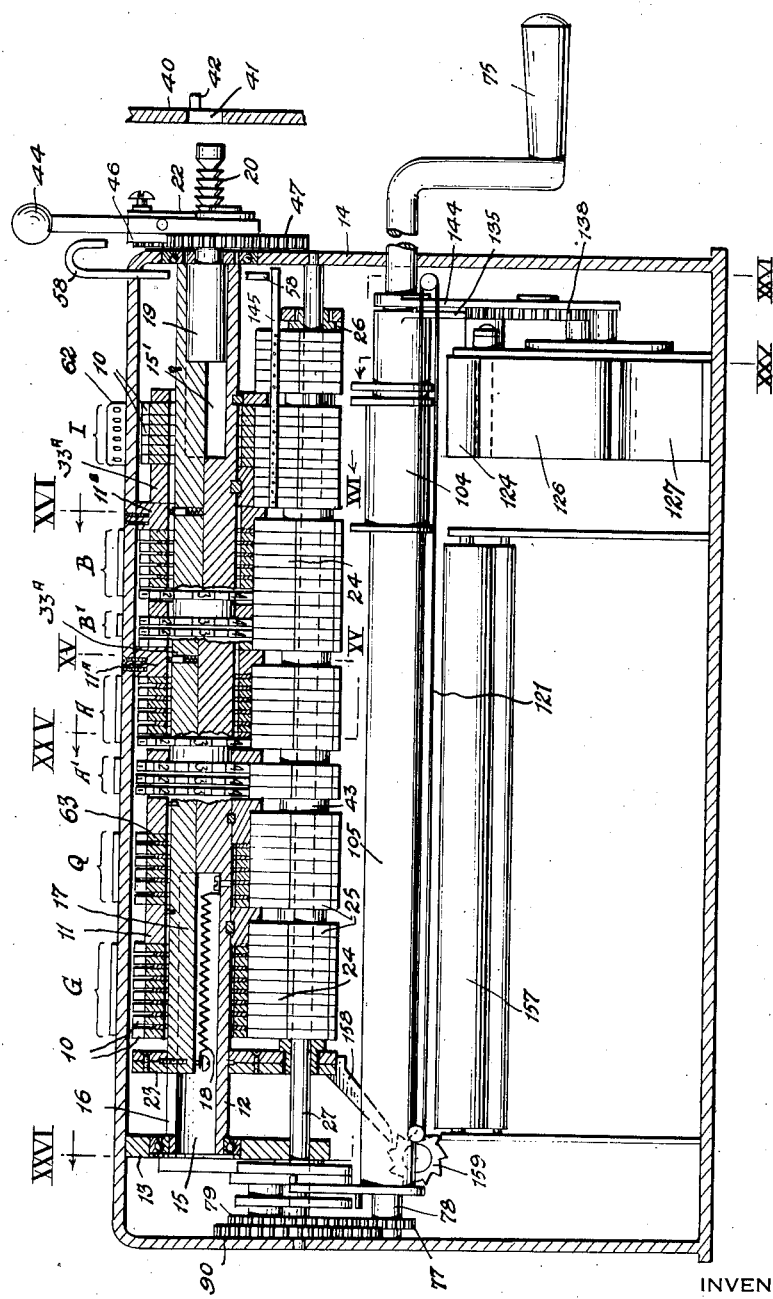
Figure 1 is a front view, partly in longitudinal section of the whole cash register.

The cash register shown on the drawings comprises, from left to right on Figure 1, a general totaliser G, a daily totaliser Q, a first clerk's totaliser A with operation counter $A^1$ and a second clerk's totaliser B with operation counter $B^1$. It permits, for example, to register separately the operations of two salesmen on the totalisers A and B, of counting the number of these operations on the counting mechanisms $A^1$, $B^1$, of registering on the daily totaliser Q all the operations carried out by the two salesmen in one day, and of registering the whole of the operations of a week or of a month, for example, on the general totaliser G. Furthermore, an indicator I to the right of the register indicates the amount of each operation.

The various totalisers and counters, as also the indicator, are each constituted by a group of annular discs 10, all identical, each provided with ten teeth bearing the numbers 0 to 9. Distance pieces 11 separate the groups of discs and prevent them from shifting in the axial direction.

All the discs 10 are provided with axial bores and fitted freely on a common shaft or spindle 12 which is mounted horizontally between a bracket 13 and the right-hand side wall of the frame 14 of the register, so as to be able to rotate in ball bearings. Bored out at 15 and 15' at the two extremities, this spindle 12 has furthermore a longitudinal groove 16 of rectangular section in which is fitted a flat bar 17 forced towards the right by a spring 18 fitted in the hollow 15, and rigidly connected to the piston 19 by screws, said piston 19 being adapted to slide in the hollow part 15' and having a projecting rack 20.

Under the action of the piston 19 in one direction, and of the resetting spring 18 in the other direction, the bar 17 can slide axially in the groove 16 of the spindle 12, executing a step-by-step movement controlled by an escapement which comprises the rack 20 with circular teeth and two pawls 21, 22 shown in detail on Figures 13 and 14. Each axial displacement of the bar, permitted by the escapement, corresponds to the distance from center to center between two successive discs 10 adjacent to each other of the totaliser. This bar 17, movable axially in the groove 16 of the spindle 12, is also movable angularly with this spindle and it constitutes the operating member of the discs.

The bar 17 and yoke 23 are connected in the manner represented in Figs. 1 and 3. Yoke 23 comprises two plates screwed together (Fig. 1). A small pin carried by bar 17 (Fig. 3) engages in a circular groove between the two plates of the yoke, so that the bar 17 may be rotated with respect to yoke 23, while the bar and yoke are locked together as regards axial movements.

In its axial movement, the bar 17 carries with it by the yoke 23 a set of pawls 24 (Figs. 1, 17 and 18) engaging yieldingly with the teeth of the totaliser discs 10. Each pawl is provided with an eye 25, and said pawls are fitted side by side by their eyes on a sleeve 26 axially rigid with the yoke 23 and adapted to slide on a fixed spindle 27 parallel to the spindle 12. The set of pawls 24 constitutes the means blocking the discs.

The bar 17 and the set or comb of pawls 24 are axially movable together as a unit, the set of pawls of the unit moving on the outside of the totaliser discs 10 whilst the bar 17 moves inside the discs 10 and can furthermore rotate together with the spindle 12 about the axis of said spindle.

The walls of the bores of the annular discs 10 are each formed with a rim of notches comprising ten round holes 28 each communicating by a constricted neck 29 (Figure 19) with the central open part of the disc filled by the spindle 12. Due to the pawls 24 engaging with the teeth of the discs 10 and holding these in a correct angular position, the holes 28 of the different discs are always in line, and formed around the spindle 12 ten tunnels in each totaliser.

In these tunnels there engage and slide on an axial displacement of the bar 17, driving projections or buttons 30 projecting from the longitudinal free face of the bar 17. These buttons 30 have a spherical head adapted to the diameter of the holes 28 of the discs 10, a restricted neck being able to pass in the restricted part of these holes and a cylindrical body fitted in a recess of the bar 17.

There is a button 30 on the bar 17 for each totaliser G, Q, A, B, and for the indicator I. The three buttons $30^G$, $30^Q$, $30^I$ of the general totaliser G of the daily totaliser Q and of the indicator I are fixed in the bar 17. The buttons $30^A$, $30^B$ of the clerk's totalisers are adapted to disappear in their recesses 31; against the action of a spring 32 (Figures 15, 16). This disappearance is necessary to permit the selective control of one or the other of the clerk's totalisers A, B.

The selection is effected by means of a special arrangement of the fixed parts $11^A$, $11^B$ (Figures 15, 16), serving as selectors, which are at the right of the partial totalisers (Figure 1) and comprise each a circular chamber $33^A$, $33^B$ of less depth than said selectors, the bottom of said chambers having a rim of holes $28^A$, $28^B$, respectively (Figures 15, 16) registering with the holes 28 of the totaliser discs. Some of these holes, which are differently located in each selector, are replaced by one or more larger notches, in the form of arcs. The selector $11^A$ comprises a single notch 34 occupying the place of two successive holes, whilst the selector $11^B$ comprises two notches 35, 36 each occupying the place of one hole and leaving between them a hole $28^B$.

Figures 16a, 16b and 16c show the constructional details of one of said selectors, i. e. selector $11^B$. As shown, the selector comprises two parts of equal width or depth, one $33^B$ being a circular chamber of such diameter that the button $30^B$ in the projected position may turn therein freely, the other portion or chamber having a diameter equal to the diameter of shaft 12, with holes 28 arranged around its periphery except where they are replaced by notches 35, 36 (Figs. 16b, 16c). The selector $11^A$ (Fig. 15) is of identical construction, except in that it has one notch 34 instead of the two notches 35, 36 of selector $11^B$.

In its inoperative position, the bar 17 is at the end of its travel to the right (Figures 1 and 18), and the buttons $30^A$ and $30^B$ project vertically from said bar into the chambers $33^A$, $33^B$ respectively, and face the notches 34 and 35, respectively.

To select a clerk's totaliser, it is necessary to shift the actuating bar 17 first axially towards the left to cause the buttons $30^A$, $30^B$ to enter respectively the notches 34, 35 in front of them, and then angularly by a tenth of a turn in clockwise direction if it is desired to select the totaliser A, or of two-tenths of a turn in clockwise direction if it is the totaliser B which is to be selected. It is thus necessary to rotate bar 17 through a predetermined angle in order to permit either button 30A or button 30B to project into a notch (respectively 34 or 36), before the next axial movement of bar 17 takes place. Only that button which has come out of the recess 31 can, during the axial movement of the bar, engage the holes 28 of the totaliser corresponding thereto and rotate the discs of said totaliser. After a tenth of a turn, in fact, the button 30A remains projecting in the wide notch 34 and can thus be engaged, by a later axial movement of the bar 17, in one of the tunnels formed by the holes 28 of the discs 10 of the totaliser A, whilst the button 30B has been forced back into its recess 31 by the arcuate wall of the notch 35, and remains hidden during the later axial displacement of the bar 17, the narrowness of the constricted necks 29 preventing it from leaving its recess to engage in the holes 28 of the discs of the second clerk's totaliser B. This latter is therefore eliminated while the totaliser A is selected. In other words, the button which has not entered a notch (34 or 36) of its selector, but was pushed back into the recess 31 is held in said recess during the whole operation, because the necks 29 of the holes 28 are too narrow to enable the button entering any of said holes.

If, however, totaliser B is to be selected, then the bar 17 is rotated through two tenths of a turn. At the end of this angular movement the button 30A is pressed back into the recess 31 by the curved side of notch 34, whereas button 30B stands in the middle of notch 36 where it projects freely. Thus during the subsequent axial movement of bar 17, the button 30B will be engaged in the holes 28 in the discs of totaliser B and said totaliser B will be selected while button A will remain hidden and totaliser A will not be operated. Thus, the second clerk's totaliser B is selected. It is clear that in this way up to nine clerk's totalisers could be selected by causing the bar 17 to rotate by nine-tenths of a revolution, provided that each clerk's totaliser were fitted with a selector 11 having suitable notches.

Since the general totalisers G and Q partake in all registering operations, there is no selector co-operating with said totalisers. The distance pieces 11 adjoining the totalisers G and Q and the indicator I (Fig. 1) are annular spacing rings fixed on shaft 12 and having each at their inner periphery a longitudinal groove adapted to receive the corresponding buttons 30G or 30Q respectively, whatever be the angular position of the latter or of bar 17.

To effect the selection, the operating member 17, in the example shown, is manipulated by the operator by means of a key 37 (Figures 2, 7 and 7a) the T end 37' of which engages in the slot 20' at the extremity of the rack 20. This key has two webs or bits, the first of which 38 is narrow and parallel to the wings of the T, and the second 39 is wide and offset with respect to 38 by an angle corresponding to one or two tenths of a revolution according to whether it is a question of the key of the totaliser A or of that of the totaliser B. It is clear that the offsetting can run, for example, from 1 to 9 tenths of a revolution for nine different keys, if the register comprises nine clerk's totalisers.

There is made in the outer wall 40 of the register, a vertical keyhole 41 for the passage of the key (Figures 1 and 7). When the key is inserted, its end 37' only comes into engagement with the slot 20' at the end of the rack 20 when the web or bit 38, placed vertically, enters the hole 41. On continuing to insert the key, the operator pushes towards the left the rack 20 and the actuating bar 17, thus engaging the buttons 30A, 30B into the notches 34, 35 of the selectors 11A, 11B. The second web 39 then abuts against the surface 40 and can only enter the hole 41 after the operator has turned the key by a tenth of a revolution if it is the key of the totaliser A, or by two-tenths of a revolution if it is the key of the totaliser B, thus causing the bar 17 to rotate with the spindle 12 by the angle necessary to select the desired totaliser A or B.

It will thus be seen that the web 38 enters hole 41 when the end 37' of the key comes into engagement with the slot 20' at the end of rack 20. The key then is inserted farther and it is turned only when the second web 39 abuts against the wall 40. Then the web 38 is clear of said wall and the key may be rotated.

It will be understood that this rotation of the bar 17 with the buttons 30G, 30Q, 30A, 30B and 30I has no action upon the totaliser discs since, during this rotation, all the buttons are engaged in the distance pieces 11 and selectors 11A, 11B, respectively, and not in the holes 28 of any totaliser discs.

The operator can then fully insert the key and thus press the bar 17 to the end of its travel towards the left, which has for effect to engage the driving buttons 30G, 30Q, 30A or 30B and 30I respectively in the general totaliser G, the daily totaliser Q, the clerk's totaliser A or B selected, and the indicator I.

Actually the whole selection operation of the totalisers is reduced, for the operator, to inserting in the hole 41, and pushing and rotating the key of the totaliser which he desires to select. A stop 42 arresting the web 39 opposite the hole 41 avoids any groping. The general totaliser G and the daily one Q having to register all the operations of the cash register, do not give rise to selection.

After selection of the totalisers and complete displacement of the bar 17 to the left, the key 37 is fully withdrawn so that the bar 17 together with the shaft 12 and discs 10 may rotate.

The axial displacement of the bar 17 to the extreme left under the thrust of the key 37 causes a corresponding displacement of the set of pawls 24, the pawls of which slide laterally over the teeth of the discs 10. It will be noticed (Figure 1) that, in the plane of each driving button (30G, 30Q, 30A, 30B and 30I) one pawl is missing in the set, and is replaced by a spacing ring 43 a little wider than a disc 10. This permits the individual discs 10 which are at the moment engaged by the driving buttons to rotate without resistance, whilst all the other discs 10 are normally blocked by the pawls.

The unit 17—24 is held in the extreme left-hand position, against the tension effect of the spring 18, by the pawl 21 which engages with the last circular tooth adjacent the slot 20' of the rack 20. In this position the mechanism is ready to register an operation. To effect this, the operator allows the unit 17—24 to come back step-by-step towards the right (Figure 1) in order to bring each button 30 successively in engagement with each of the discs 10 of the totaliser in which this button is engaged. At each stoppage of the unit 17—24 produced by the engagement of a fresh tooth of the rack 20 with the pawl 21, the operator rotates the bar 17 with the spindle 12 by a number of tenths of a revolution corresponding to the number of units to be registered in the numerical order allocated to those of the discs 10 in engagement with the buttons 30 at the moment in question. These discs being opposite spaces in the set of pawls 24, are free to rotate at this moment, but are blocked immediately afterwards by the following pawls when the forward movement of the unit 17—24 brings the buttons 30 into engagement with the following discs, of a lower numerical order in the selected totalisers.

When the operator, after entering the last digit of an item, (which is that of the lowest numerical order), allows once more the unit 17—24 to return to the right, there are no more teeth on the rack 20 to be engaged by the pawl 21, and the spring 18 brings the bar 17 back to its initial extreme right-hand position (Figure 1), with the driving pins 30A, 30B within the respective circular chambers 33A, 33B.

An example will now be given, showing the manner in which the wheels 10 are operated to add items.

Let us suppose the amount to be registered by the general totalisers G and Q and the totaliser A is 349.00. Totaliser A having been selected as explained before, the bar 17 is moved to the left as far as it can go (Fig. 1), its buttons 30 are engaged in the "hundreds" discs of all the operative totalisers. The operator then lowers handle 44 pivoted at 45 through three divisions along scale 45a (starting from the vertical position shown in Fig. 13), and by doing so he turns, through three tenths of a turn, shaft 12 with bar 17, buttons 30 and the discs 10 engaged by said buttons. Movement of the handle 44 is transmitted to the shaft 12 through a pawl 46 engaging the teeth of a toothed wheel 47 which latter meshes with a toothed wheel 48 keyed on the shaft 12. When handle 44 is then raised towards or beyond the vertical position, the angular position of the discs 10 is not altered, as the pawl 46 (Fig. 13) idles over the teeth of the wheel 47 without rotating either said wheel or the pinion 48. By pushing handle 44 beyond the vertical position, the operator produces an escapement of bar 17 by one step towards the right, as hereinafter described, the result being that the buttons 30 leave the "hundreds" discs and come into engagement with the "tens" discs. Having brought the handle 44 back to vertical position, the operator now lowers it through four divisions along scale 45a, whereby all the "tens" discs are rotated through four tenths of a turn. Again the operator moves the handle beyond vertical to produce a further escapement of bar 17 by one step, thus bringing the buttons 30 into engagement with the "units" discs. Then handle 44 is lowered through nine divisions along scale 45a, thereby rotating the "units" discs through nine tenths of a turn. Finally, the handle 44 is twice pushed backwardly to cause two escapements whereby the discs 10 in the two decimal places remain in zero position. The desired number 349.00 thus is set up in all the operative totalisers, that is to say, in all the totalisers except those in which the buttons 30 were pushed down during the selection.

Supposing the operator now has to add the number 23.00 to the number 349.00 previously recorded. He does not have to bother about the angular position of the discs 10, because whatever be their position resulting from previous operations, the holes 28 in adjacent discs always form around shaft 12 ten tunnels in any of which the projecting buttons may travel. First the discs of the indicator I are released for restoration to zero and the unit 17—24 which is now shifted completely to the right in turned upon actuation of the member 58 under the influence of the spring 55, which operations will be hereinafter described, until the slot 20' is restored to its initial vertical position. Again the desired totaliser is selected, and bar 17 is moved as far as possible to the left by means of the key 37. As there are no hundreds to be recorded, the handle 44 is pushed backwardly to produce an escapement and to bring about the engagement of the "tens" discs by the buttons 30, the "hundreds" discs remaining in set position. Then handle 44 is lowered through two divisions of the scale to rotate the "tens" discs through two tenths of a revolution, the handle is moved back and after a further escapement, it is lowered through three divisions to rotate the "units" discs through three tenths of a revolution. The handle 44 is again swung rearwardly twice so that the discs 10 in the two decimal places remain in set position.

After each registering operation, the operator rotates shaft 78 by means of crank 75 in order to complete the carry-over of the tens, which carry-over was prepared in the course of the registering operation as will be described in greater detail hereinafter.

When the handle is pushed back beyond the vertical position shown in Figure 13, it releases the escapement of the unit 17—24 by acting on the escape pawls 21, 22 already mentioned, and arranged on each side of the rack 20 with which they co-operate. When at rest, the pawls 21 engage with the rack and the pawl 22 is disengaged therefrom. For the disengagement, a boss 44' of the handle forces the pawl 22 into engagement and disengages the pawl 21, the operation being effected by the pawl 22 striking a projection 49 of this pawl 21. The pawl 22 is movable along its axis 50 (Figures 13, 14) over a distance equal to one tooth of the rack. Liberated from the pawl 21, the rack driven by the unit 17—24 moves with it by this distance carrying with it axially the pawl 22 until this latter stops against the head 51 of the spindle 50. If the handle 44 is then brought back into the vertical position, a spring 52 replaces the pawl 21 in engagement with the rack, whilst the pawl 22 is disengaged therefrom by a spring 53 and is drawn back by a spring 54 (Fig. 14) into position for a fresh escapement. The complete escapement can be produced by bearing directly on a driving member 21' of the pawl 21, thereby disengaging the latter from the rack 20, the pawl 22 being held in inoperative position by the spring 53.

After each escapement whereby in each totaliser the corresponding button 30 has been brought into engagement with a fresh disc 10 of a lower numerical order to the preceding one, the operator can lower the handle 44 to cause the rotation of the discs in engagement with the desired number of tenths of a turn and then put back the handle to effect a fresh escapement, and so on.

The lowering of the handle 44 and the consecutive rotation of the small wheel 48 cause the rotation in the direction of the arrow (Figure 13) of a large toothed wheel 55 urged in the reverse direction by a spiral spring 56. After the lowering of the handle, a pawl 57 retains the wheel 48 against the action of this spring 56. If the pawl 57 is disengaged by depressing its operating member 58, which is integral with 57 and which turns about the axis 57', the spring 56 causes the counter-clockwise rotation of the small wheel 48, with the spindle 12, the pawl 46 of the wheel 47 then resting against a fixed stop 59 and being disengaged from the wheel 47 which can thus rotate with the wheel 48 without carrying the handle 44 with it in clockwise direction beyond the position represented in Fig. 13. Clockwise rotation of the wheel 55 will thus rotate the wheel 47 and handle 44 clockwise until the handle is slightly beyond the position shown in Fig. 13 when the pin 59 will act to disengage pawl 46 from wheel 47 and thus liberate 44 from any further clockwise movement. It is advisable, however, to put the handle beyond the position shown in Fig. 13 before disengaging the pawl 57 by depressing 58. This manipulation permits in particular the operator to cancel or correct a wrong manipulation of the handle 44, having had for effect to impart an incorrect number of tenths of a turn to the discs 10 at the moment in engagement with the buttons 30.

When cancelling a wrong manipulation, the backward rotation of wheel 48 and of shaft 12 with bar 17 will be stopped at the moment when the incorrectly actuated disc is reset to zero, owing to the following arrangement; the discs 107 of the printing mechanism are normally engaged by the indicator discs 10. When, after an operation which is to be cancelled, the spring 56 is permitted to rotate the wheel 48 backwards, and with it the bar 17 and those discs 10 including an indicator disc which are engaged by projections 30, the said indicator disc rotates the corresponding wheel 107 of the printing mechanism until its pin 108 (Fig. 21) is stopped by the finger 109, which happens when the discs involved are at zero.

As above stated, each lowering of the handle 44 can impart up to nine-tenths of a turn to the spindle 12, and consequently to the discs 10 in engagement with the buttons 30. The capacity of rotation of the wheel 55 from one side to the other of a stop piece 60 which it strikes against at the ends of its travel through a spur piece 61, must therefore be equal to the rotation due to the key 37 plus as many times nine-tenths of a rotation of the spindle 12 as there are teeth in the rack 20, since the latter determine the number of positions of the unit 17—24 for which the handle 44 can impart a movement, up to nine-tenths of a turn, to successive discs 10 in each totaliser. In other words it will be seen in Fig. 13 that all the rotational movements of spindle 12 are transmitted to the toothed wheel 55, which can rotate through an angle of almost 360°, limited by the pin 61 striking on one or the other side of abutment 60. Supposing we have to register the highest number which is 999.99 in the constructional example illustrated, then wheel 55 must be able to turn with pinion 48 while said pinion, together with shaft 12, rotates through five times nine tenths of one turn. But previously, when the selecting operation was performed by means of key 37, the shaft 12 with its pinion 48 had already effected a partial rotation (i. e. one tenth of a turn if totaliser A was selected, or two tenths of a turn if totaliser B was selected) and this initial rotation had also been transmitted to wheel 55.

It is thus made possible by actuating the single handle 44 of the manipulator for the operator to cause the successive rotation of each of the discs 10 of each totaliser to introduce into the latter the desired number of units of each numerical order for example of the hundreds, tens, units and decimal fractions of units. At the same time as the discs 10 of the different totalisers, and the discs 10 of the same numerical order of the indicator 1 are also rotated by the same amount, and they cause the appearance in a mirror 62 of an amount which is that of the operation being carried out, the indicator starts from zero each operation. The operator can thus check in the mirror whether the amount shown is really that which he has desired to introduce into a given digital order and, in case of error, he can correct by means of the push member 58 as described above. In other words, the indicator discs being controlled by a button $30^1$ which is not collapsible, the indicator will register each item entered in any one of the totalisers, starting each time from zero. The operator thus is enabled to check from the indicator the correctness of each figure in the amount recorded, and also to correct any mistake as already pointed out.

Up to the present, the general operation of the totalisers and their control by the manipulating mechanism which permits of the simultaneous rotation by the desired amount of the discs of the same numerical order in the different totalisers, has been explained. In addition to these movements effected positively, there are produced in the totalisers automatic movements for the carry-over of the tens of units of the discs of a numerical order to the discs of the higher numerical order. The carry-over of the tens is prepared automatically, in each totaliser, but it only becomes operative on the manipulation of a control crank common to all the totalisers, which permits of cancelling a carry-over arising from an incorrect item entry in a given order when the erroneous entry is cleared as long as the crank has not been actuated.

The mechanism preparing for the carry-over comprises flat rings 63, arranged on the spindle 12 where they alternate with the totaliser discs 10, each of said rings being fixed to the disc 10 located immediately to its right. One of these rings 63 is shown dotted on Figure 17 behind the disc 10 to which it is fixed, which disc on Figure 18, is to its right. It comprises a ring of holes corresponding to the holes 28 of the disc, and it has on its periphery a notch 64 followed by a nose piece 65.

When the disc 10 to which the ring 63 is fixed has rotated by nine-tenths of a revolution from the zero position, in clockwise direction, (Fig. 17) a finger 66 which was held in position against the edge of the ring by a stop 67, enters the notch 64 and is carried along, on the following tenth of a turn of the disc, by the nose piece 65 which causes it to rock about its axis 68 beyond the plane passing through the centres of this axis and of the spindle 12. In this position of the finger 66, a spring 69 is tensioned and presses the finger against the ring, but this time upwardly. The finger 66 remains in this position as long as the ring 63 continues to rotate with its disc 10 in clockwise direction. But if the disc and the ring are rotated in the contrary direction, for example in order to cancel a wrongly formed figure, as explained above, the finger 66 enters the notch 64 when it comes opposite it. The ring 63 then carries it along until above the line of the centres of the spindle 12 and the axis 68, and its spring returns it into the initial position, which nullifies the preparation of the carry-over.

On the finger 66 there is fixed, opposite the next higher order disc 10, a piece 70 carrying a tooth 71, a projection 72 and a counter tooth or projecting portion 76. In the raised position of the finger, the part 70 through its counter tooth 76 bears against the stop 67 but when the finger has been rocked by the nose piece 65 to prepare the carry-over of a unit to the following disc 10, the projection 72 comes into the trajectory of a cross-arm 73 mounted on a spindle 74 adapted to be actuated by the crank or handle 75 of the register. The carry-overs are thus prepared in each totaliser in the course of each operation.

When, after having effected the operation, the operator rotates the handle 75, the arm 73 is rotated in clockwise direction (Fig. 17) by the spindle 74 and strikes the projection 72, causing the rocking of the part 70, the tooth 71 of which engages between two teeth of the disc 10 to which the unit is to be carried over, and causes this disc to be rotated by a tenth of a turn. To avoid the disc rotating further by inertia, the counter tooth 76 of the part 70 blocks the disc immediately after it has rotated through the desired angle. Rotation of the disc in the opposite direction under the influence of the spring 69 operating through the part 70 is prevented by the related pawl 24. All risk of error in the carry-overs is thus avoided.

The spindle 74 carries an arm 73 for each totaliser disc, and the successive arms are displaced angularly by 90° so as to actuate successively the parts 70 of the successive discs of the same totaliser, in order that the carry-overs may be effected from one disc to the other without omission. The arms 73 carry out three rotations for two rotations of the crank 75. The transmission is effected by gears arranged on the left-hand side of the casing, that is to say, a small pinion 77 keyed on the spindle 78 of the crank (Figures 9 and 12), a pinion 79 of double the diameter joined to a larger pinion 90 and a small pinion 91 keyed on the spindle 74 of the arms 73.

A little before the end of the movement of the crank 75 a cam 92 (Figs. 8 to 12) driven through shaft 27 by the pinion 90 acts on an arm of an elbow lever 93 which it causes to oscillate about the axis 74. The other arm of the lever 93 carries the stop 67 and the axis 68 of the carry-overs fingers 66. On rocking with the lever, the spindle 68 draws back and all the fingers 66 leave the rings 63 and can lift up into their initial position against the stop 67 under the action of their springs 69.

There now will be given an example for explaining the carry-over operations in a totaliser, reference being made to Figs. 17a–17d.

Supposing the amount previously recorded on totaliser A is 349.00 and the operator wishes to add thereto 23.00. To that end he has turned through two tenths of a turn the "tens" disc 10" Fig. 17d) and this disc now records 4+2=6. After escapement, the button 30A has engaged the "units" disc 10', as shown in Figs. 17a, 17b and 17c.

In Fig. 17a, disc 10' still records the figure 9. The ring 63 rigidly connected with 10' then is in such a position, with respect to the finger 66, that disc 10' only has to rotate through one tenth of a turn in order that the carry over be prepared by the engagement of finger 66 in notch 64. This position is shown in Fig. 17b.

However as the operator has to register not one unit but three units, he does not stop disc 10' in the position of Fig. 17b but he rotates it through three tenths of a turn, thus bringing disc 10' to the position shown in Fig. 17c, where the figure 2 is recorded (9+3=12). The Figs. 17a, 17b and 17c also show the successive positions of parts 70, 71 and 72, the latter in Fig. 17c being in the path of travel of the arms 73.

The operator now turns the crank 75, thus turning shaft 74 and its arms 73. One of these arms strikes projection 72 and causes the piece 70 to rotate still further in the same direction as previously (Fig. 17d). During this movement the tooth 71 has engaged disc 10" and caused it to rotate through one tenth of a turn, so that it records the figure 7 instead of 6, the required carry over thus having been effected. Immediately thereafter the counter-tooth 76 engages disc 10" and prevents said disc and the piece 70 from rotating further. The spring 69 being under tension will return piece 70 to its initial position as soon as the shaft 68 and stop 67 have been withdrawn as explained before.

It will be seen that the rotation of disc 10" through one tenth of a turn, due to the carry over of one unit to said disc, does not cause a rotation of bar 17 and does not influence the other totaliser discs.

Figure 17:
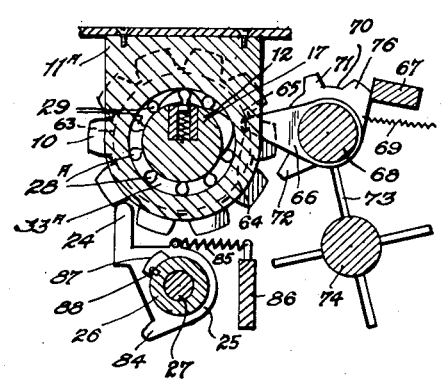
Figure 17 is a cross-section on the line XVII—XVII of Figure 18, showing a selector and a carry-over mechanism.
Figure 18:
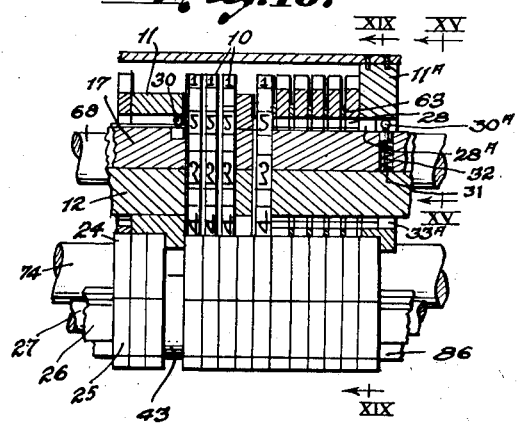
Figure 18 is a longitudinal section of a clerk's totaliser and of its selector.

If after committing an error, the operator rotates backwards the ring 63 (with its associated disc 10), see Figs. 17c and 17b, the notch 64 allows the finger 66, drawn by ring 63 and spring 69, to resume its initial position shown in Fig. 17. The carry over which had been prepared by the downward movement of finger 66 thus is cancelled together with the erroneous operation which had caused the carry over to be prepared.

As has been stated above, the clerk's totalisers A and B are each flanked by an operation counter $A^1$, $B^1$ (Figure 1) constituted of discs 10 identical to those of the totalisers. At each operation registered by a clerk's totaliser the first disc 10 of the latter which rotates, lifts, by the action of its teeth on a wide boss 94 covering all the discs of the totaliser, a spring blade 95 (Figures 19 and 20), the end of which, forming a hook, is thus disengaged from a part 96 similar to the part 70 of the carry over mechanism and mounted like said part 70 on the spindle 68. This piece 96 oscillates, drawn by a spring 97, its tappet 98 comes in the path of one of the arms 73 which carries it along when the handle 75 is rotated, so that a tooth 99 of the piece 96 causes the counter disc indicated by 10' to advance by a tenth of a revolution. As heretofore noted, Fig. 1 shows, in axial section, the operation counters A' on the left-hand side of totaliser A, and B' on the left-hand side of totaliser B. These two counters are identical with each other. Fig. 20 is a top view showing, on a larger scale, one of said counters (for example A').

It is seen from Figs. 19 and 20 that the spring blade 94, 95 is lifted as soon as any one of the discs of the corresponding totaliser is rotated. The piece 96 thus being freed, its spring 97 causes said piece to rotate and bring the tappet 98 into the path of one of the arms 73 (which is not illustrated in Fig. 19, but all the arms 73 are shown in Fig. 8). When the handle 75 is rotated with the shaft 74 and the arms 73 the carry over of a unit to the first disc of the counter is effected in the same manner as the carry over in the totalisers.

The carry over of tens in the counters takes place in the same manner and by means of identical parts as the carry over in the totalisers. These parts have not been shown in Fig. 19 in order not to overburden the drawing, as it will be understood that they are the same as the parts 70, 66 shown in Fig. 17. Of course, the blades 94, 95 have nothing to do in the carrying of tens in the counters. The carry over of the tens of one disc to the other of the counter is carried out as for the totaliser, and the return of the driving members and of the carry over members to the position of rest, apart from the discs, is also controlled by the rocking of the spindle 68 at the end of the movement of the handle 75. It will be understood that the counter counts a unit at each operation of the corresponding clerk's totaliser.

The handle or crank 75 controls, directly after each operation registered by the machine, the printing mechanism intended to print the amount of the operation on tickets delivered by the register, and to fulfill other functions such as the resetting to zero of the indicator I after each operation and of the clerk's and daily totalisers at the end of the day, as also the printing of the amounts totalled by all the totalisers.

Figure 21:
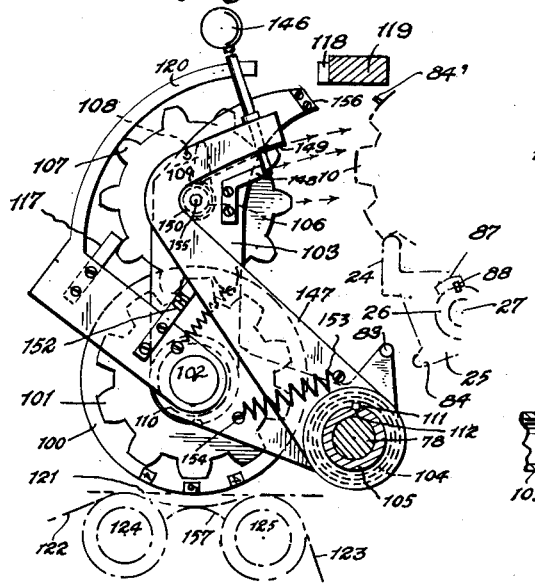
Figure 21 is a side view of the printing mechanism.
Figure 22:
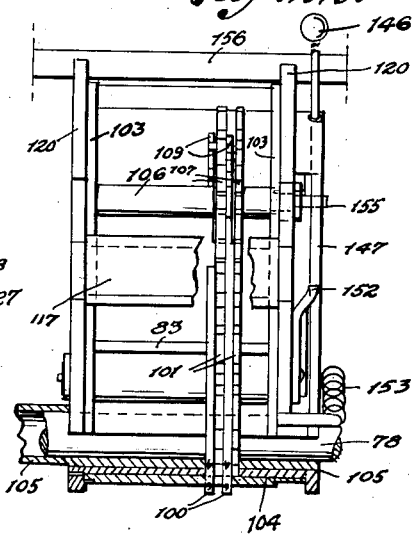
Figure 22 is a front view thereof omitting certain parts.
Figure 25:
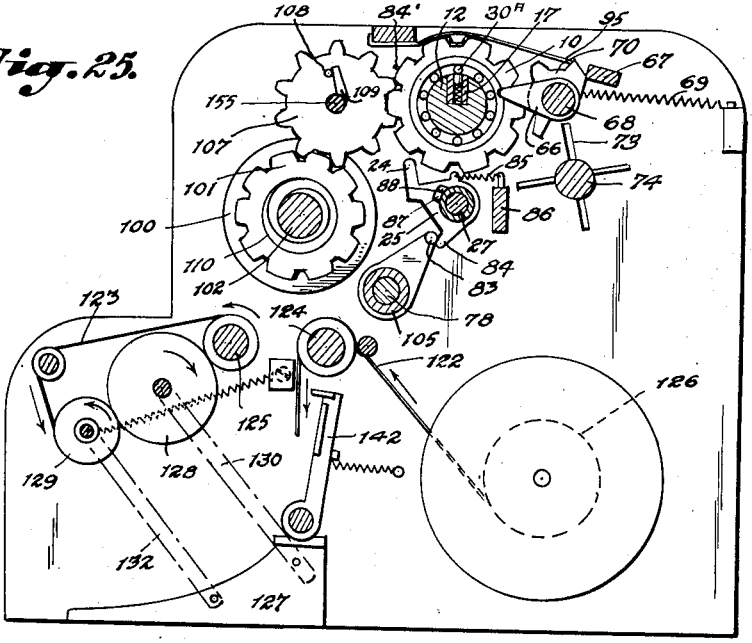
Figure 25 is a cross section on broken line XXV—XXV of Figure 1.

The printing mechanism (Figures 21, 22 and 25) comprises an oscillating printing head comprising a series of character discs 100, each provided with ten teeth 101 and loosely mounted side by side on a spindle 102 between two uprights 103. The latter are cross connected at the foot by a sleeve 104 fitted on to a tubular spindle 105 surrounding the spindle 78 of the crank 75, and at the top by a spindle 106 carrying a series of toothed wheels 107 of ten teeth each which engage permanently with the teeth 101 of the character discs. Fig. 1 shows on spindle 105 the sleeve 104 carrying the printing head. Said head with the sleeve 104 can slide along the whole length of spindle 105 which is coaxial with spindle 78 (Figs. 1, 21, 22, 26). Fig. 25 shows the printing head in front of totalizer A. The wheels 107 are mounted loosely on the spindle 106 and each can be carried around by it by means of a pin 108 forced along by a radial finger 109 of the spindle 106. In the position of rest of the printing head, the wheels 107 engage with the discs 10 of the indicator I. Consequently, each value set up on the indicator is reproduced on the printing head, the character discs 100 of which rotate in unison with the discs 10 of the indicator. This rotation of the discs 100 tensions in the boss of each of these a spiral spring 110 fixed on the the one hand to the wheel, and on the other hand to the fixed spindle 102. As shown by Figure 21, the arrangement of the printing characters on the edge of the discs 100 (the drawing shows them on the side of the disc for greater clearness) is such that the printing head can effect simultaneously two impressions of a single amount on each side of the vertical plane passing through its axis 102. Fig. 27 shows outside of the large circle the characters which print upon rollers 124 and 125. These characters pass the rollers 124 and 125 in clockwise succession when the character discs 100 turn in unison with the wheels 10 of the indicator. The sleeve 104 of the printing head is in engagement through a pin 111 with a longitudinal groove 112 of the tubular spindle 105, which extends up to the left-hand extremity of the register where it carries a triangular plate 113 (Fig. 10) provided with two small rollers 114, 115.

When at the end of an operation the crank is rotated, the pinion 90 rotates a cam 116 (Figure 10) which forces back the roller 114 and thus causes the place 113 and the whole of the printing head to rock from right to left about the spindle 78, the uprights 103 being integral with the plate through the tubular spindle 105 and the sleeve 104. The wheels 107 disengage from the discs 10 of the indicator (Figure 21) whilst a large pawl 117, pivoting on the spindle 102, which had hitherto been kept away from the wheels 107 by the meeting of a boss 118 of the stop 119 with a curved nose piece 120 of this pawl, blocks the wheels 107 in order to prevent the springs 110 from distending.

The printing head strikes, with the interposing of an inked ribbon 121, two bands of paper 122, 123, passing over two rollers 124, 125 and prints simultaneously the same amount on the two ribbons due to the suitable arrangement of its characters. Coming from a spool 126 (Figures 23, 24 and 25) the strip 122 is intended to be cut up into tickets delivered to the outside of the register through a conduit 127, whilst the strip 123 constitutes the duplicate of the tickets and remains in the register for checking. It unwinds from a spool 128 to wind on to a spool 129. The conveyance from one spool to the other is effected by peripheral contact which dispenses with a special transmission between these spools 128, 129 and ensures the regular feed of the strip in spite of the variations of diameter between the spools due to the quantity of strip unwound from one spool winding on to the other. The spools carried by pivoted arms 130, 132 are drawn one towards the other and towards the roller 125 by a spring 133 attached to the axis of the spool 129.

After the printing of the tickets, the cam 116 releases the roller 114 and a spring 134 (Figure 10) acting on the plate 113, raises the printing head to bring the wheels 107 into engagement with the discs 10 of the indicator I. In this movement, an arm 135 keyed on the tubular spindle 105 causes, by means of a pawl 136 (Figures 23 and 26), the advancement by one tooth of a ratchet wheel 137 integral with a toothed wheel 138 which engages with two pinions 139, 140 of different diameters. The small pinion 139 keyed on the axis of the roller 124 causes the strip 122 to advance by the length of a ticket, through the intermediation of this roller 124, whilst the large pinion 140 causes the strip 123, to advance by a distance one-quarter as much, through the intermediation of the roller 125, this strip 123 constituting the duplicate of the ticket. Due to the reduction, it is possible to deliver a ticket of ordinary size whilst having a duplicate of the ticket occupying only small space on the strip 123 which therefore only takes up a little room in the register.

Each printed ticket is cut from the strip 122 by a knife 142 integral with a bent arm 143 on which the tappet 144 keyed on the spindle 78 of the crank 75, strikes to actuate the knife at each rotation of the crank. During the first of each two revolutions of shaft 78, the knife 142 receives an idle movement, since, at that time, the amount is being printed on the paper strip which has not yet been fed forward. During the second revolution of shaft 78, the strip 122 is moved forward by the length of one ticket so that at the end of said revolution the next movement of knife 142 cuts off the printed ticket.

The return of the printing head into the raised position brings the wheels 107 into engagement with the discs 10 of the indicator I. Just before this takes place, the upper extremity of the curved nose piece 120 strikes the stop 118 and this disengages the pawl 117 from the wheels 107. Nevertheless, since the discs 10 are prevented from rotating counter-clockwise by their pawls 24 (Figure 1), the wheels 107 remain blocked and the springs 110 remain tensioned. The amount set up therefore remains shown at the indicator.

At the commencement of the following operation, the operator bearing on the pusher 58 (Figs. 1 and 13) to permit the spring 56 to bring the spindle 12 into its initial angular position by counter-clockwise rotation, which is now possible because all buttons 30 are completely disengaged from the discs and the selectors, starts at the same time the movement for resetting the indicator to zero. To this end, a lower extension of the pusher 59 acting on a part 145 (Fig. 1) which connects all the pawls 24 blocking the discs 10 of the indicator I, disengages these pawls from the discs 10 which are then free to rotate. The springs 110 distend causing the character wheels 100 to rotate, which wheels through the intermediation of the wheels 107, bring the discs 10 to zero by themselves coming to zero, when the pins 108 reach the fingers 109. At the same time there is another stop when the pins 84' of the indicator wheels reach the stop strip 156.

There will now be described the operations of the printing mechanism in connection with the totalisers of the cash register, for the printing of the amounts accumulated at the totalisers and the resetting to zero of the latter. Whilst the portion of the printing mechanism which comprises the rollers 124, 125 and the ticket spools remains at a fixed position under the indicator I, the printing head 101, 107 constitutes a carriage which can be moved from one end to the other of the register by sliding the sleeve 104 along the tubular spindle 105, in order to be brought opposite one or the other of the totalisers. These movements of the printing head may be controlled by the operator by means of a handle 146 (Figures 21 and 26) which projects through a vertical slot of the outer casing of the register, which slot forms a portion of a grid of slots in the front wall (not shown) of the outer casing.

The handle 146 is mounted on a lever 147 pivoted on the tubular spindle 105 and coupled to the printing head by the tail of the handle 146 engaging in a catch 148 on one of the uprights 103. This lever carries at the top a rack with ten teeth 149 which engages with a small pinion 150 keyed on the spindle 106.

When the handle 146 is lowered in the vertical slot of the casing, the lever 147 engaging the catch 148 causes the printing head to swing towards the position shown in Figure 21 until the roller 115 of the triangular plate 113 comes into contact with a cam 151 (Figure 26) which stops the swinging movement when the wheels 107 are disengaged from the discs 10 of the indicator. On then pulling outwardly on the handle 146, its tail is caused to pass over the catch 148 and it can be further lowered with the lever 147, which has for the first effect to cause said lever 147 to depress a catch 152 and thus to disengage the pawl 117 from the wheels 107, and secondly to impart by means of the rack 149 and the pinion 150 a complete revolution to the spindle 106 which rotates, by its fingers 109 the wheels 107 and 101. The latter are thereby reset to zero and their springs 110 are fully wound up. The lowering of the lever is assisted by a spring 153 and is limited by a stop 154. It is held in the lowered position by inserting the tail of the handle 146 behind a stop 155 (Figure 22) formed by an extension of the spindle 106.

Figure 26:
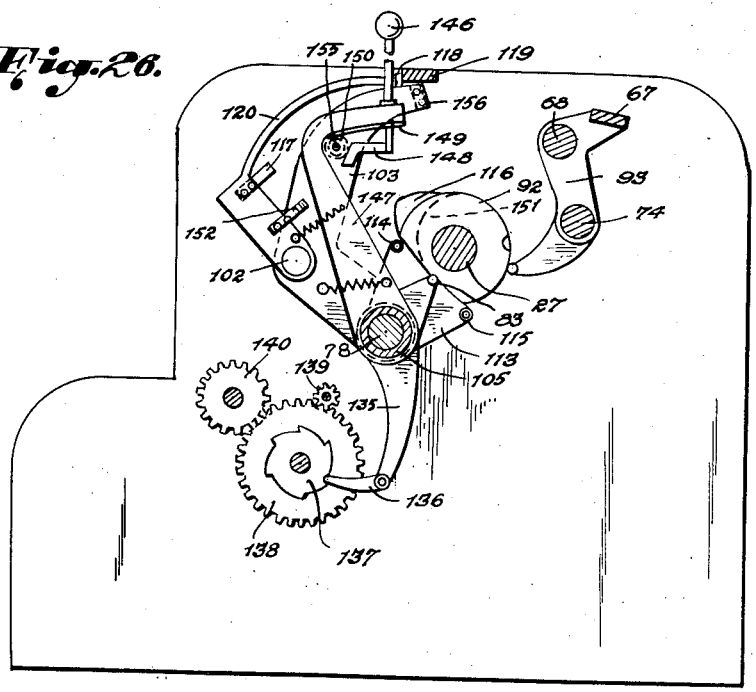
Figure 26 is a cross-section on the broken line XXVI—XXVI of Fig. 1.

Still by means of the handle 146, the operator then shifts the whole printing head horizontally along the spindle 105 until it comes opposite the totaliser to be set to zero. This movement of the handle is guided in a horizontal slot of the cover of the machine. Opposite the desired totaliser a vertical slot comes in front of the handle. The operator causes the handle to move upward in this slot which has for effect to raise the printing head, the wheels 107 of which come into engagement with the toothed discs 10 of the totaliser (Figs. 25 and 26). At the same time a bar 82 carried by the uprights 103, Figs. 22 and 25 engages the heels 84 of the pawls 24 appertaining to the discs 10 of the totaliser in question, thus disengaging these pawls from the discs. If the operator disengages the tail of the handle 146 from the stop 155, the springs 110 distend causing the rotation of the wheels 100 and 107 which rotate the discs 10 counter-clockwise. As will be understood, this movement of the wheels 100 and 107 is possible because the pawl 117 is held in inoperative position by engagement of the nose piece 120 with the stop 118. Each disc 10 will rotate until a projection 84' of its periphery strikes against a stop strip 156 on the printing head. The disc 10 is then at zero whilst the amount which it indicated is transferred to the correspond disc 100 which has rotated by the same angle but starting from zero. For printing values corresponding to the positions in which the discs 100 are set by the totalizers, each disc 100 is provided with an additional set of printing characters represented in Fig. 27 by the inner circular series of numerals 0 to 9. In setting the discs 100 for printing the values set up in the totalizer, said discs are thus rotated in the direction opposite that in which they revolve when being set for printing by the indicator I and accordingly the printing characters utilized in these two printing operations progress in numerical value in opposite directions circumferentially of the disc, as shown in Fig. 27. Since the same operation takes place for each disc of the totaliser and of the printing head the amount and if desired the identification letters registered on the totaliser are transferred to the printing head where they are inscribed in the plane passing through the axis 102, whilst the entire totaliser is wholly reset to zero.

If the operator then rotates the crank 75, the printing head oscillates under the action of the cam 116 as previously described and prints the amount of the totaliser on an account sheet or docket supported by a roller 157 under the inked ribbon 121 in the plane passing through the axis 102.

The operation is repeated for the resetting to zero of each totaliser, and the printing of the amount registered thereby. After the resetting to zero of the totaliser, a spring 85 (Figs. 17 and 25) attached to the bar 86 of the unit 17—24 brings each pawl 24 back into engagement with its disc 10, to block it.

A pawl 158 (Fig. 1) actuated at the commencement of each operation of the register by the unit 17—24 acts on a ratchet wheel 159 to cause the feed forward of the inked ribbon 121, so as to avoid it being used constantly at the same place.

The disengagement of the pawls 24 which is produced to permit the rotation of the discs 10 in clockwise direction, under the action of the carry-over mechanism previously described, is only possible when the unit 17—24 is at the terminal position of travel towards the right. The sleeve 26 like the pawl 24 is controlled by a spring attached to the bar 86 and which tends to rock the sleeve clockwise. In this position the sleeve 26, on which are fitted the eyes of the pawls, is free to rotate. When a pawl oscillates under the thrust of a disc 10 rotating clockwise, it carries the sleeve 26 with it by a notch 87 of its eye 25 and a rib 88 of the sleeve (Fig. 25). This latter pivots with the pawl which has oscillated, but its movement does not influence the other pawls of the comb, in the notches 87 of which the rib 88 can freely move.

But when the unit 17—24 is moved towards the left to select and actuate the totalisers, the sleeve 26 is prevented from rotating by the engagement of a pin 161 on the shaft 27 with a slot 160 on said sleeve 26 (Fig. 2) and it no longer permits the oscillation of the pawls 24 during the manipulation of the totalisers by means of the bar 17 and of the driving buttons 30. It follows that all the discs of the totalisers are blocked except those which are in engagement with the buttons 30 and opposite which the comb of pawls is interrupted, as explained above.

It is shown by the present description that the cash register according to the invention is capable of carrying out a large number of operations with a comparatively small number of members and devices. Naturally, the invention is not restricted to the particular members and devices which have been described by way of example, and its scope would not be departed from by introducing modifications.

I claim:

1. In combination, a movable printing head carriage, printing discs rotatably mounted in said carriage, two sets of numerical printing characters arranged on each disc and progressing in numerical value in opposite directions circumferentially of said disc, the characters of one set being displaced with relation to the other set circumferentially of each disc, and separate impression members for the sets of characters relatively displaced in accordance with the displacement of said characters, means effective in one position of the carriage to variably turn the discs in one direction to position the characters of one set with respect to the related impression member, and means effective in another position of the carriage to variably turn the discs in the opposite direction to position the characters of the other set with respect to the related impression member.

2. In combination, a movable printing head carriage, printing discs rotatably mounted in said carriage, pairs of numerical printing characters on each disc, the characters of each pair being relatively displaced and having the same numerical value and the numerical values of the successive pairs progressing in one direction circumferentially of each disc, separate impression members for the sets of characters relatively displaced in accordance with the displacement of said characters and arranged to cooperate with the printing characters in one position of said carriage, a further set of numerical printing characters on each disc, the numerical value of the characters of said further set progressing in the opposite direction circumferentially of the disc, and an impression member for the characters of said further set arranged to cooperate with the characters of said set in another position of the carriage.

3. In combination, a movable printing head carriage, printing discs rotatably mounted in said carriage, two sets of numerical printing characters arranged on each disc and progressing in numerical value in opposite directions circumferentially of said disc, the characters of one set being displaced with relation to the other set circumferentially of each disc, means for shifting said carriage into different positions in the direction of the axis of said discs, and separate impression members for said sets of characters respectively occupying positions displaced in one direction in accordance with the circumferential displacement of the characters and in the other direction in accordance with the different positions of the carriage.

4. In combination, a movable printing head carriage, printing discs rotatably mounted in said carriage, two sets of numerical printing characters arranged on each disc and progressing in numerical value in opposite directions circumferentially of said disc, the characters of one set being displaced with relation to the other set circumferentially of each disc, means for shifting said carriage into different positions in the direction of the axis of said discs, separate impression members for said sets of characters respectively occupying positions displaced in one direction in accordance with the circumferential displacement of the characters and in the other direction in accordance with the different positions of the carriage, and means operable in the different positions of the carriage for rotating the discs in opposite directions to selectively position the characters of the two sets with respect to the related impression members.

5. In combination, an impression member, a plurality of control mechanisms located in positions disposed longitudinally of said impression member, a printing head carriage movable in one direction into positions corresponding with the location of selected control mechanisms and including printing discs engageable and selectively settable by the selected control mechanism upon movement of the carriage in another direction, and means for effecting relative movement of said carriage and impression member to cause the discs to print upon an area of the impression member corresponding with the position of the control mechanism utilized to set said discs.

6. In combination, a longitudinal impression member, a plurality of control mechanisms located in positions disposed longitudinally of said impression member, a printing head carriage movable in one direction into positions corresponding with the location of selected control mechanisms and including printing discs engageable and settable by the selected control mechanism upon movement of the carriage in another direction, and means for operating the printing head to cause the discs to print upon an area of the impression member corresponding with the position of the control mechanism utilized to set said discs.

7. In combination, a printing head carriage movable into two positions, printing discs rotatable in said carriage, rotatable setting members, means operable in one position of said carriage for transmitting setting movement of said setting members in one direction to said discs, releasable means for retaining said setting members in set position, means for releasing the retaining means to effect the simultaneous release of the several setting members an impression member engageable by said printing discs in a second position of said carriage, and spring means supported by the carriage and operable in the first position of said carriage upon release of said retaining means by the releasing means to return the discs and setting members in the opposite direction.

8. In combination, a printing head carriage movable into two positions, printing discs rotatable in said carriage, rotatable setting members, means mounted in said carriage and operable in one position of said carriage for transmitting setting movement of said setting members in one direction to said discs, releasable means for retaining said setting members in set position, means for releasing the retaining means to effect the simultaneous release of the several setting members an impression member engageable by said printing discs in a second position of said carriage, spring means operable in the first position of said carriage upon release of said retaining means by the releasing means to return the discs and setting members in the opposite direction, and means to limit the return movement of the discs and setting members.

9. In combination, a printing head carriage movable into two positions, printing discs rotatable in said carriage, rotatable setting members, means mounted in said carriage and operable in one position of said carriage for transmitting setting movement of said setting members in one direction to said discs, releasable means for retaining said setting members in set position, means for releasing the retaining means to effect the simultaneous release of the several setting members an impression member engageable by said printing discs in a second position of said carriage, and spring means supported by the carriage and operable in the first position of said carriage, upon release of said retaining means by the releasing means to return the discs and setting members in the opposite direction.

10. In combination, a printing head carriage movable in two positions, printing discs rotatable in said carriage, rotatable toothed setting members, gears rotatable in said cariage and engageable with said setting members for transmitting setting movement of said setting members to said discs in one position of the carriage, releasable means for retaining said settable members in settable position, means for releasing the retaining means to effect the simultaneous release of the several setting members an impression member engageable by said printing discs in a second position of said carriage, and spring means operable in the first position of said carriage upon release of said retaining means by said releasing means to return said discs, gears and setting members in the opposite direction.

11. In combination, a printing head carriage mounted to swing into printing position, settable printing discs rotatable in said carriage, spring means effective, when tensioned, to rotate said discs in one direction, manually controlled means for tensioning said spring means, adjustable means engageable by said discs for variably limiting the movement of said discs under the influence of said spring means, and means operable when said carriage is swung toward printing position to lock said discs in set position following disengagement of said discs from said adjusting means.

12. In combination, a printing head carriage mounted to swing in opposite directions into printing and setting positions, printing discs rotatable in said carriage, rotatable control members settable in one direction to selected positions, means for establishing a driving connection between said printing discs and said control members in the setting position of said carriage, spring means effective to drive the printing discs and rotate the set control members in the opposite direction through the drive connection means, manually operable means for tensioning said spring means, and means for limiting the rotation of the control members in said opposite direction to determine the printing position of said printing discs.

13. An arrangement as claimed in claim 12, wherein said tensioning means includes a shaft, a manually operable lever for rotating said shaft, and means for imparting the movement of said shaft to said drive connection means.

MARCEL DEMEULENAERE.

REFERENCES CITED

The following references are of record in the file of this patent:

UNITED STATES PATENTS

| Number | Name | Date |
| --- | --- | --- |
| 433,728 | Hadley | Aug. 5, 1890 |
| 703,335 | Cottrill | June 24, 1902 |
| 907,577 | Diehl | Dec. 22, 1908 |
| 1,063,180 | Canine | June 3, 1913 |
| 1,088,812 | Dement | Mar. 3, 1914 |
| 1,149,342 | Carroll | Aug. 10, 1915 |
| 1,167,332 | Brown | Jan. 4, 1916 |
| 1,305,546 | Jessen | June 3, 1919 |
| 1,311,884 | Fuller | Aug. 5, 1919 |
| 1,359,173 | Horton | Nov. 16, 1920 |
| 1,389,214 | Payne | Aug. 30, 1921 |
| 1,404,443 | King | Jan. 24, 1922 |
| 1,776,076 | Kuhrt | Sept. 16, 1930 |
| 1,823,262 | Errera | Sept. 15, 1931 |
| 1,878,125 | Fuller | Sept. 20, 1932 |
| 2,034,542 | Thomas | Mar. 17, 1936 |
| 2,041,752 | Fuller | May 26, 1936 |

FOREIGN PATENTS

| Number | Country | Date |
| --- | --- | --- |
| 798,042 | France | May 8, 1936 |